June 22, 1926.
F. E. MARTIN
1,590,107
MECHANISM FOR CONTROLLING MOVEMENT OF HOOK DOGS FOR SAWMILL CARRIAGES
Original Filed June 23, 1922   2 Sheets-Sheet 1
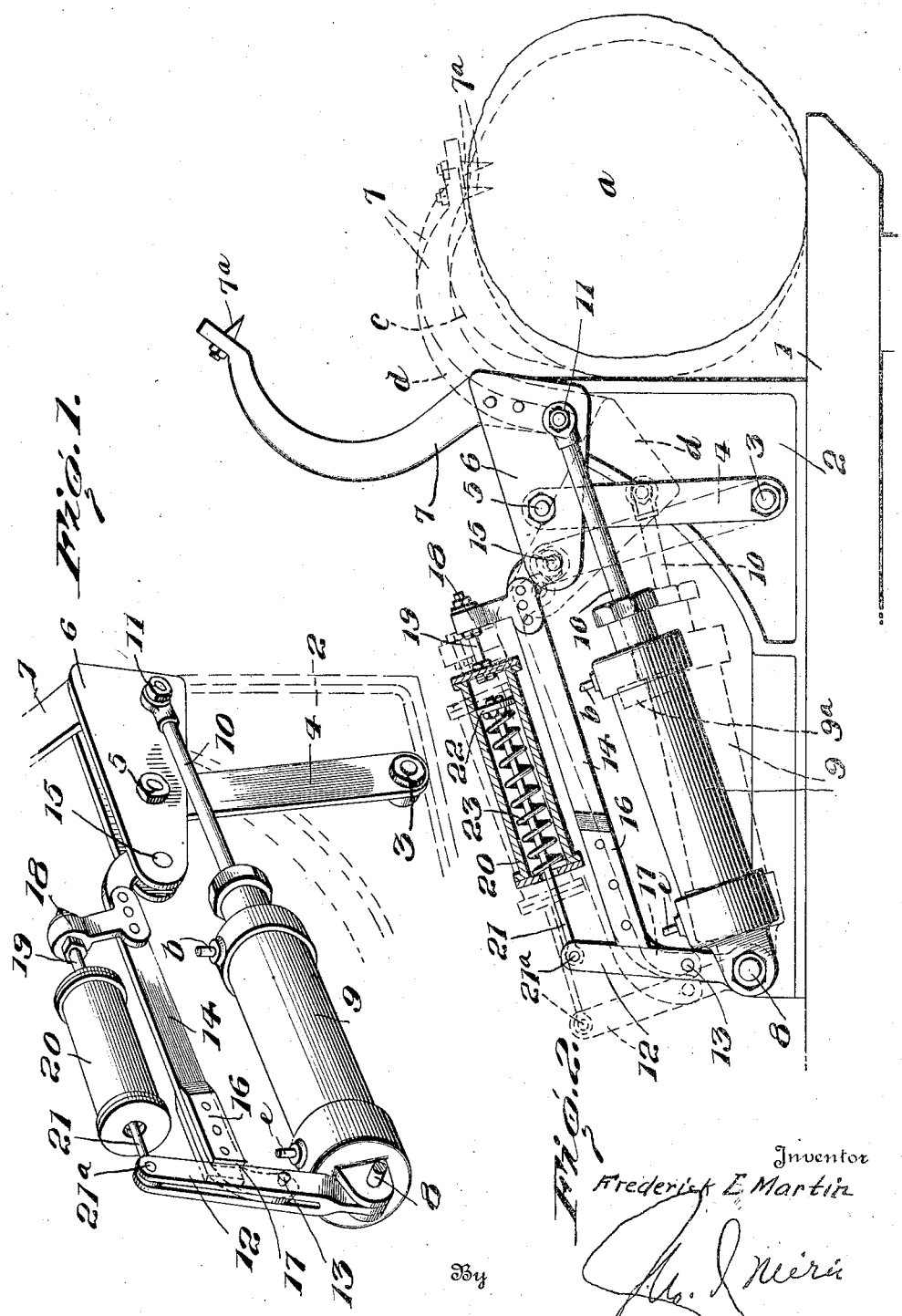
Inventor
Frederick E. Martin
By
Attorney

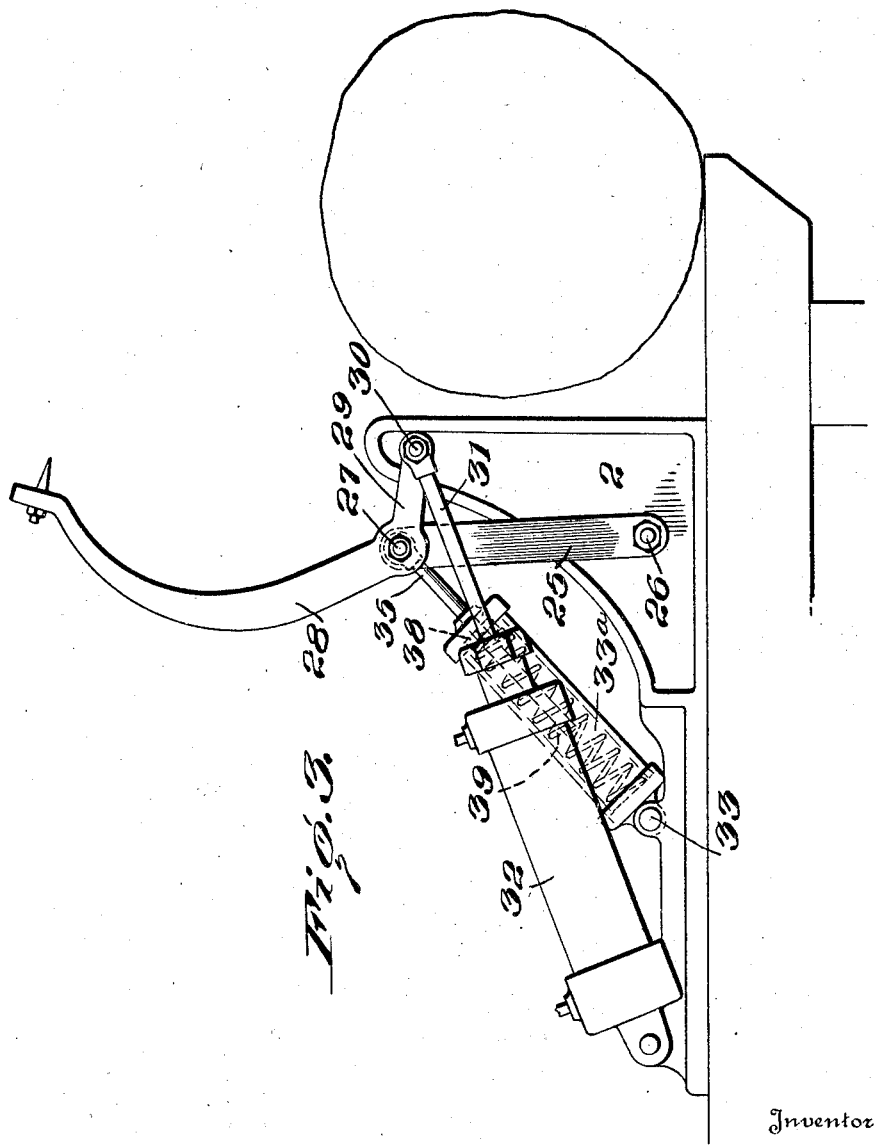

Patented June 22, 1926.

1,590,107

UNITED STATES PATENT OFFICE.

FREDERICK E. MARTIN, OF WEED, CALIFORNIA, ASSIGNOR TO MARTIN AIR DOG COMPANY, OF SAN FRANCISCO, CALIFORNIA, A CORPORATION OF CALIFORNIA.

MECHANISM FOR CONTROLLING MOVEMENT OF HOOK DOGS FOR SAWMILL CARRIAGES.

Application filed June 23, 1922, Serial No. 570,398. Renewed May 4, 1926.

This invention relates particularly to hook dogs controlling and operating mechanism employed in connection with saw mill carriages of the type disclosed in my copending application for patent, filed November 25, 1921, Serial No. 517,647.

In the application referred to, the hook dogs are described as having a movement first in a curved path until the spike engages a log, and subsequently and by the same actuating means the dog is moved bodily toward the knee to pull the log up against the face of the knee to properly locate it for engagement of the boss and other dogs.

My present invention is directed to improving the construction of the mechanism for actuating the hook dogs, so as to more effectually handle logs of varying diameters, and to simplify the parts that they may with greater convenience be assembled, repaired, or replaced.

Therefore, one of the objects of the invention is to provide a hook dog and operating mechanism therefor, which will be effective in operation and positively engage and draw a log up to the face of the knees to be "dogged."

A further object of the invention is to provide improved means for compensating for the movement between the hook dog per se and its actuating means when the curved path of movement of the dog is converted into a direct pull on the log.

Another object of the invention is to improve the means employed to take the thrust and equalize the strain between the parts when the hook dog strikes a log and subsequently pulls the same up to the knee.

The invention also comprehends improvements in the details of construction and arrangement of parts which will be hereinafter described and particularly pointed out in the claims.

In the accompanying drawings:

Fig. 1 is a perspective view of the preferred form of the improved hook dog controlling and operating mechanism.

Fig. 2 is a side elevation of the same, an operative position of the parts being shown in dotted outline.

Fig. 3 is a view in elevation of a modified arrangement of such mechanism.

The numeral 1 indicates conventionally a portion of a saw mill carriage provided with a knee 2. Mounted on a pivot 3 on the knee, is an arm 4, on the upper end of which is pivotally mounted at 5, a frame 6, of a hook dog 7.

Mounted on a pivot 8, on a lug extending from the knee, is a cylinder 9, and operating in same is a piston 9ª, the rod 10 of which extends forwardly and is connected to a stud 11, on the frame 6. The stud 11 is located forwardly of and below the horizontal plane of the pivot 5, as shown in Fig. 1.

Mounted to rock on the pivot pin 8, is a bifurcated lever 12, and supported on a pivot 13 between the bifurcated portions of said lever is a link 14, which extends forwardly substantially parallel with the cylinder 9, and is pivoted at its front end at 15 to the frame 6 in rear of the pivot pin 5. On the sides of the link 14, adjacent the lever 12, are abutments 16, the rear edges 17 of which are adapted to bear against the forward edge of the lever 12 and form a stop to properly hold the hook dog in normal elevated position after pressure is applied to return the parts.

Extending upwardly from the forward end of the link 14, is a lug 18, and projecting rearwardly therefrom is a stem 19, which is bolted to the forward head of a cylinder 20. Projecting through the rear head of the cylinder 20, is a rod 21, pivoted at one end 21ª to the upper end of the lever 12 in alignment with the stem 19. Bolted to the forward end of the rod 21 in the cylinder 20, is a disk 22 and encircling the rod between the disk and the rear head is a spring 23, the tension of which through the cylinder tends to draw the lever 12 toward the lug 18.

In Fig. 3, I have shown a modified form of construction, in which the arm 25 is mounted on a pivot 26 in the same manner as in the preferred form of the invention, but the connections with the hook dog and the spring are arranged in quite a different manner. On a pin 27 at the upper end of the arm 25, is pivotally mounted the hook dog 28 having a forwardly extended arm 29, and at the extremity of this arm is a pin 30, to which is pivoted the piston rod 31 of the fluid pressure actuated piston and cylinder 32.

33 indicates a pivot pin located in rear of the pin 26 and to which is pivoted the lower end of a cylinder 33ª. Extending slidably through the upper head of the cylinder 33ª, is a stem 35, the outer end of same being pivoted on the pin 27. On the stem 35, inside the cylinder 33ª are adjusting nuts 38, between which and the lower cylinder head is interposed a spring 39, adapted to be compressed when the arm 25 is rocked rearwardly.

In the operation of the preferred embodiment of the invention, a log $a$ is thrown onto the carriage in the usual manner, then fluid pressure, preferably air, is admitted through pipe $b$, from a suitable source and under control of selective mechanism, such as disclosed in the before mentioned application (but not herein shown) which forces the piston 9ª and rod 10 rearwardly, and rotates the frame 6 on the pin or floating fulcrum 5. As the frame 6 rotates on the fulcrum 5, it moves the hook dog until its spike 7ª engages and is driven into the log as shown by dotted lines $c$, in Fig. 2. During this movement, the pivot pin 15 rotates upwardly and rearwardly in an arc of which the pivot 8 is the center as a result of the arcuate path of travel of the pin 5 with pin 3, as its center. In the meantime, the spring 23 holds the link 14 in relation to the frame 6, and lever 12, and forms a resilient cushioned connection between the parts and is ready for the next step in the operation, where said spring performs a very essential function. After the spike of the hook dog is engaged in the log, and assume the latter is not up against the face of the knee, fluid pressure in cylinder 9 continues to act on the piston and rod 10, and as the frame and hook dog can no longer swing in a curved path toward the log, these elements are moved bodily toward the rear, as shown in dotted line $d$, in Fig. 2. While this action imparts a slightly arcuate movement with pin 3 as its center, it is of so little moment, it amounts to substantially a movement parallel to the cylinder 9. In this bodily movement of the frame, the link 14 is forced rearwardly which rocks the lever 12 on its pivot, and the upper end of said lever exerts a pull on the rod 21 and compresses the spring 23, which with the pressure exerted on the piston and rod 10, exerts a pulling action on the hook dog on one side of the pivot pin 5 and a pin resistance on the opposite side of said pin, the spring cushioning or yielding to compensate for any movement in the pull of the piston and therefore effectually draws the log up to position against the knee.

When the log is held in this position with the parts operated as described, the action of the spring and the pressure on the piston in cylinder 9 not only exert the necessary pull on the log to hold it in place, but in addition the combined yielding resistance of the spring and the pull of the piston in the cylinder combined with the toggle action between the lever, frame, and link, serves to create a downward action of the hook dog and absolutely prevents it from slipping or becoming disengaged.

When pressure in cylinder 9 is relieved through pipe $b$ and pressure is admitted through pipe $e$, the lever 4 is reversely moved on its pivot, and the tension of spring 23 immediately exerts itself until the abutments 17 contact with the lever 12, and then the pressure in the cylinder 9 returns the hook dog to its normal position.

In the modified form of the invention shown in Fig. 3, the result is substantially the same as that described, in that the curved path of movement of the dog on the floating fulcrum 27 is imparted through pressure introduced in cylinder 32, and the fact that during operation of this pressure the fulcrum 27 is floating rearwardly under the continual increasing resistance of the spring 39. In this movement, it is apparent that through pull on the piston rod, the dog is moved about the fulcrum 27 while the latter is being moved rearwardly to thereby induce a downward movement of the stem 35 to cause the nuts 38 to compress the spring 39 in the cylinder 33ª, the necessary arcuate movement of the fulcrum about the center 26 being compensated for by the bodily movement of the cylinder 33ª about the center 33. This affords a cushioned resistance to compensate for any irregularity of movement in the parts and permits the fulcrum 27 to float during the swing of the dog and to permit a continued floating of the fulcrum 27 under the power in the cylinder 32 after the dog engages the log. Therefore, the action of the parts in the modification is the same as described in connection with the preferred form.

By mounting the hook dog on the floating fulcrum, I am able to handle logs within a wide range of dimensions, without liability of extending the hook in the path of movement of the saw. For instance, if a big log is to be engaged, the hook will swing down in a path toward the log and hold it with the same facility as a small log. But in handling a big log, the liability of the hook extending beyond the saw cut line is not as great as when sawing small logs with the same hook, and it is therefore essential that the hook dog be made to accommodate logs of all sizes. Now if a small log be engaged, the hook dog will first swing outwardly in a curved path and then sharply rearwardly in the curved path until the spike strikes about the center of the log before it commences to pull it toward the knee. In other words, the path of travel of the spike of the hook dog, because of the floating fulcrum, is not a true arc but more nearly elliptical.

The invention is, therefore, constructed and arranged to provide a floating fulcrum about which the dog is swung by the power means. The spring means acts to permit the power means to draw the log toward the knee through a pull on the hook dog directly resulting through a floating movement of the fulcrum, with such spring means increasingly retarding this floating movement of the fulcrum during the log drawing movement of the hook dog. It is to be particularly noted that the spring means does not interfere with a floating movement of the fulcrum during the swing of the hook dog from its normal position to a log engaging position, the said spring means coming into effective action in connection with the floating fulcrum following the engagement of the hook dog with the log.

What I claim is:

1. In combination, a knee, a dog for a saw mill carriage, a floating fulcrum for the dog, operating means connected to the dog on one side of the fulcrum, a lever pivoted to the knee, a link pivoted to the lever and to the dog on the other side of the pulling fulcrum, and a spring between the link and lever, the operating means serving to initially impart movement to the dog in a curved path on the floating fulcrum until the dog strikes the log, further action of the operating means pulling the log toward the knee through continued movement of the floating fulcrum and the resistance of the spring through resultant movement of the link and lever to compel such bodily movement of the floating fulcrum.

2. In combination, a dog, a floating fulcrum for same, means pivoted on one side the floating fulcrum to operate the dog, a pivoted lever, a link having one end pivoted to the lever and its opposite end pivoted to the opposite side of the dog, a spring, and means supporting the spring between the pivoted lever and the link, whereby to permit first a rocking movement of the dog and subsequently a pull after the dog engages a log.

3. A swinging hook dog, a floating fulcrum therefor, means for swinging said dog on and constantly moving said floating fulcrum, and means brought into play through the swinging movement of the dog after the latter contacts with a log to resist movement of said fulcrum after the dog strikes a log, said last named means finally acting as a fulcrum for the dog.

4. In combination, a dog, a fulcrum therefor capable of becoming a floating fulcrum, a power means for swinging the dog on said fulcrum, a lever pivoted remote from the dog, a link connected at one end to said lever and at its opposite end to the dog, and a spring connected to said lever and to the link, said spring being increasingly tensioned through movement of such link and lever following a predetermined movement of the dog on said fulcrum, such increased tension of the spring permitting the power means to float such fulcrum to move the dog in a substantially linear path.

5. In combination, a knee, a dog for a saw mill carriage, a fulcrum for the dog capable of becoming a floating fulcrum, pressure operated means connected to the dog for swinging the same on said fulcrum, a lever pivoted to the knee remote from the dog, a link connected to said lever and to the dog, a spring normally exerting a tension between said link and lever, the normal tension of said spring being substantially maintained throughout the swinging movement of the dog and being then increased by relative movements of the link and lever, the increased tension of said spring permitting a further operation of the power means to float the fulcrum to move the dog in a substantially linear path.

6. In combination, a dog, a fulcrum therefor capable of becoming a floating fulcrum, a power means for moving the dog on said fulcrum, a lever pivotally supported remote from the dog, a link arranged between said lever and dog, and a spring interposed between and tensioned in the relative movements of the link and lever, said spring being normally tensioned to tend to return the dog on an elevated position, said power means acting to swing the dog on said fulcrum and to cause such relative movement of the link and lever to thereby increase the tension of the spring and permit the power means to float the fulcrum to move the dog in a substantially linear path.

7. A knee, a dog mounted for swinging movement relative thereto, a power means for swinging the dog, a lever pivotally mounted with respect to the knee and remote from the dog, a link pivotally connected at one end to the lever and at the opposite end in pivotal relation to the dog mounting, said link having means to bear against the lever and move the latter in movement of the link, a projection on the link adjacent the dog mounting, and a resilient connection between said projection and lever, the tension of said connection being increased in that movement of the link tending to move said lever on its pivot after the dog strikes the log.

8. A knee, an arm pivoted thereto, a dog supported by said arm for swinging movement into engagement with a log and subsequent linear movement to draw the log toward the knee, a power means pivotally supported on the knee and connected for operating said dog, a lever pivoted on the knee remote from the dog, a link pivotally connected at one end to said lever and formed with a shoulder to bear against and operate said lever in a linear movement of the link in a direction from the dog, the opposite end of said link being connected to the dog mounting, a projection extending from the link adjacent the dog mounting, and a resilient connection between said projection and lever, the link, lever, and resilient connection moving substantially as a unit on the lever pivot in the swinging movement of the dog to avoid substantial change in the tension of the resilient connection during such dog movement, the linear movement of the dog compelling a similar movement of the link to increase the tension of such resilient connection to permit such linear dog movement.

9. A knee, a dog mounted for swinging movement relative thereto, a floating fulcrum for the dog, a power means for swinging the dog about said fulcrum and moving the fulcrum, a lever pivotally mounted with respect to the knee remote from the dog, a link connecting said lever and dog, and a resilient connection intermediate said lever and link, said resilient connection being tensioned in that movement of the floating fulcrum under the power means tending to move the dog after said dog has engaged a log.

10. A knee, a dog cooperating therewith, a floating fulcrum for the dog, a power means connected to the dog at one side of the floating fulcrum, and a tensioning unit pivotally supported with respect to the knee remote from the dog and connected to the dog on the opposite side of the fulcrum, the power means acting to swing the dog about the floating fulcrum and move said fulcrum until the dog engages a log, the tensioning unit being thereafter tensioned in the movement of the floating fulcrum under the power means to permit said power means to move the dog to draw the log toward the knee.

In testimony whereof I affix my signature.

FREDERICK E. MARTIN.